(12) United States Patent
Chen et al.

(10) Patent No.: US 8,926,142 B2
(45) Date of Patent: Jan. 6, 2015

(54) LED LENS AND LIGHT EMITTING DEVICE USING THE SAME

(71) Applicant: E-Pin Optical Industry Co., Ltd., Taipei (TW)

(72) Inventors: Huang-Chang Chen, Taipei (TW); Chih-Peng Wang, Taipei (TW); Kuo-Hsuan Hsu, Taipei (TW)

(73) Assignee: E-Pin Optical Industry Co., Ltd, Taipei (TW)

( * ) Notice: Subject to any disclaimer, the term of this patent is extended or adjusted under 35 U.S.C. 154(b) by 242 days.

(21) Appl. No.: 13/684,385

(22) Filed: Nov. 23, 2012

(65) Prior Publication Data

US 2013/0155690 A1    Jun. 20, 2013

(30) Foreign Application Priority Data

Dec. 14, 2011    (TW) .............................. 100146100 A

(51) Int. Cl.
   *F21V 5/04*    (2006.01)
   *G02B 19/00*   (2006.01)
   *G02F 1/1335*  (2006.01)

(52) U.S. Cl.
   CPC .............. *F21V 5/04* (2013.01); *G02B 19/0014* (2013.01); *G02B 19/0061* (2013.01); *G02F 1/133603* (2013.01); *F21U 2101/02* (2013.01); *G02F 2001/133607* (2013.01)
   USPC ...................................... 362/311.02; 362/335

(58) Field of Classification Search
   USPC .......................... 362/309, 311.02, 311.06, 335
   See application file for complete search history.

(56) References Cited

U.S. PATENT DOCUMENTS

2010/0073937 A1 *    3/2010    Ho ................................ 362/335

* cited by examiner

*Primary Examiner* — David V Bruce
(74) *Attorney, Agent, or Firm* — Muncy, Geissler, Olds & Lowe, P.C.

(57) ABSTRACT

An LED lens and a light emitting device using the same are disclosed. The LED lens comprises a light incident surface, a light emitting surface, and a bottom surface. The light emitting surface includes a first recession portion disposed at the central thereof and a protrusion portion connected to the outer periphery of the emitting recession portion. The light incident surface comprises a first optically active area and a second optically active area. The first optically active area is disposed at the central of the light incident surface, and has a second recession portion; the second optically active area is a concave surface connected to the first optically active area. The LED lens satisfies specific conditions. The LED lens distributes a light beam emitted from the light emitting device to form an even light pattern.

20 Claims, 7 Drawing Sheets

LED LENS AND LIGHT EMITTING DEVICE USING THE SAME

FIELD OF THE INVENTION

The present invention relates to a lens and a light emitting device using the same, and more particularly to an LED lens and a light emitting device applied for various illumination devices using light-emitting diodes (LEDs) as light source.

BACKGROUND OF THE INVENTION

LCD displays are widely used in TVs, laptop computers, PCs, mobile phones, and other electronic products having display function. In an LCD display, cold cathode fluorescent lamp (CCFL), field-effect light-emitting device (EL), light-emitting diode (LED), or other elements capable of emitting a visible light are used as a backlight. In recent years, LED has gradually become a preferred backlight source instead of CCFL because of its various advantages including: long lifetime (about 100,000 hours), capability of optimizing color gamut, small size/design flexibility, low-voltage power supply driven, short turn-on time, no inverter needed, efficiently operated over a wider temperature range and so on.

An LED backlight device comprises an LED matrix for providing an LCD panel illumination, usually. In order to make the LCD panel be illuminated with uniform light, and prevent bright spots being generated by LED backlight device on the LCD panel, using a lens to refract the light from an LED is the mainly solution in prior arts. Therefore, in the LCD display using LEDs as backlight source, the way to enhance the uniformity of brightness or make the light distribution be wider is the main issue for improving the LED backlight device. For example, U.S. Pat. No. 7,348,723, U.S. Pat. No. 7,963,680, U.S. Pat. No. 7,621,657, U.S. Pat. No. 7,798,679, U.S. Pat. No. 7,866,844, U.S. Pat. No. 7,766,530, US Patent Publication No. 20090116245, U.S. Pat. No. 7,474,475, and U.S. Pat. No. 7,746,565, all disclose lenses or LED devices designed for an LCD panel.

A light source device 1 shown in FIG. 1 is disclosed in U.S. Pat. No. 7,348,723. The light source device 1 comprises an optical lens 13 and a light emitting element 11 mounted on a substrate 12. The light emitting element 11 is disposed in a hemispherical recession 10 of the optical lens 13. During operation, a light beam emitted from the light emitting element 11 travels within the optical lens 13 and then passes through a light control emission face 130 of the optical lens 13. The light control emission face 130 includes a first light emitting region 130a and a second light emitting region 130b, in which the first light emitting region 130a has a slightly and downwardly curved convex configuration which curves toward the light emitting element 11. FIG. 2 is a schematic diagram of U.S. Pat. No. 7,348,723 showing an emission intensity distribution of the light source device 1. Therefore, the light pattern forms a round light pattern which includes a paraxial region with higher emission intensities and an off-axis region with lower intensities.

Nevertheless, the light source device 1 has imperfections, termed as "bright dots", which are found in the paraxial region on the illuminated object. These kinds of issues are unlikely to be overcome due to an uneven distribution of emission intensity of the light source device 1. Moreover, in order to ease the uneven light pattern generated on the LCD panel, a plurality of the light source device 1 in a backlight module have to be arranged closer to each other. Furthermore, because of the increase in demand of thin display and cost reduction, a light source device must be improved to increase the light emission angle thereof. Thus, the distance between the light source device 1 and LCD panel can be shortened, and the distance between each light source device 1 can be increased. However, the light source device 1 improves its scattering property by merely enhancing the refractive power of the light control emission face 130 thereof, such that a Fresnel reflection tends to be generated. That is, the total flux of the light emitted from the light control emission face 130 decreases. In addition, parts of light emitted from the region where the incident angle is equal to the corresponding emission angle, are overlapped thus outgoing light fluxes are concentrated, thereby causing of a ring-shaped bright portion in the light pattern. In a result, the light source device 1 is hard to have a high light-scattering ability and a uniformity of light distribution simultaneously. A light source device disclosed in U.S. Pat. No. 7,621,657 is similar to the light source device 1 disclosed in U.S. Pat. No. 7,348,723, it also has the shortcomings of having bright spots in the paraxial zone thereof and an insufficient scattering ability.

U.S. Pat. No. 7,766,530 discloses a light source device including an optical lens having a light incident surface and a light emitting surface. The optical lens has convex surfaces in an inner portion of each surface, and concave surfaces in an outer portion of each surface, thereby forming a bell shaped lens. However, this type light source device also provides a light pattern with higher intensities in the paraxial region thereof. In addition, such convex surfaces make the incident light be refract to further away from the optical axis; such concave surfaces make the light away from the optical axis of the light source device be refract to further close to the optical axis. Therefore, such light source device also has the shortcomings of uneven light distribution and deficient scattering ability.

U.S. Pat. No. 7,866,844 and US2009/0116245 disclose lenses each comprising a light incident surface having jagged structures and a recession, so as to achieve the goal of heat dissipation and prevention of generation of bright ring. However, optical structures disclosed in the two patent documents also cause a light pattern with higher intensities in the paraxial region thereof. Therefore, the requirements of light distribution uniformity and light scattering ability are hard to meet.

For improving the scattering ability of a light source device, optical lenses of the light source devices are disclosed in U.S. Pat. No. 7,963,680, U.S. Pat. No. 7,798,679, U.S. Pat. No. 7,474,475, U.S. Pat. No. 7,746,565. Each light incident surface of these optical lenses has concave curve to form a recession. In the other hand, each light emitting surface of these optical lenses has a concave part disposed at the center thereof and a convex part disposed peripherally. The optical lens disclosed in U.S. Pat. No. 7,963,680 has the light emitting surface including a cone-shaped recession at center and a light incident surface forming a bullet-shaped recession with round top. A light source device using such optical lens provides a light pattern having lower intensities in the paraxial region thereof so as to get a wider light distribution. However, such optical lens is still hard to use in a thin display due to the limit of its optical structure. In addition, the optical lens disclosed by U.S. Pat. No. 7,798,679 also could distribute the light from a light source device, to provide a wider light pattern having lower intensities in the paraxial region thereof. However, in practical applications, light nearby the optical axis is strongly refracted by such optical lens, such that the light pattern projected by the light source device has a broadened dark area in its center. In a result, such optical lens is not applicable to use in thin displays.

U.S. Pat. No. 7,474,475 and U.S. Pat. No. 7,746,565 disclose light source devices each including an optical lens having complicated optical surfaces. Both the optical lenses comprise a light emission surface having a recessed part rear the optical axis. Wherein, according to a total reflection effect, light incident on the recessed part is reflected to a refracting part that extends from the recessed part and forms a convex shape. By the optical surfaces, such light source devices can provide a light pattern having lower intensities in the paraxial region thereof to make the light distribution become wider. However, such light source devices are unlikely to provide an even light pattern in practice, in the other hand, such lenses are hard to process, and tends to be thicker and low precision as its complex spherical surface.

Broadly speaking, optical surfaces are not portions of a sphere or plane called asphere, including asymmetric free-form surfaces. Because aspherical lenses have significant effects on simplification of optoelectronic devices, and reduction of size as well as weight of optoelectronic systems including optical elements, they have been widely used in various fields according to the optoelectronic devices in recent years.

The optical structure of an LED light source device applied to a thin display is strictly controlled to ensure the uniformity of a light pattern thereof. If LED light source devices applied to a display have design deficiency, they may cause the problems of a bright dot (or a bright ring), chromatism, higher cost due to requirement of high density layout or requirement of disposing other elements for promoting even light distribution. Wherein, when an LED light source device has a problem that the light distribution made by the light source device is too concentrated or too dispersed in the paraxial zone thereof, it may cause chromatism thereby affecting the color rendering of the LCD display. Besides, high density layout of the LED light sources will result in an increment of manufacturing cost, an accumulation of heat and a reduction of the device lifetime. Disposing other elements further leads to increment of volume or weight of the display. Because displays tend to be thinner, be realistic in quality and their cost tends to be minimized, the way to enhance the scattering ability of the LED lens, and reduce chromatism as well as thickness of the LED lens is the main issue that the related manufacturers according to illumination devices are anxious to develop.

SUMMARY OF THE INVENTION

An aspect of the present disclosure is to provide an LED lens and a light emitting device applied to an LED backlight module or other illumination devices. The light emitting device using the LED lens can provide a light pattern with improved illumination uniformity and an effective divergence angle of at least 120°.

According to the aspect of the present disclosure, an LED lens having an axis of rotational symmetry is provided. The LED lens comprises a light incident surface, a light emitting surface, and a bottom surface extended from the light incident surface and connected to the light emitting surface. The light emitting surface is an aspheric surface that includes a first recession portion disposed at the center of the light emitting surface and a convex portion connected to the outer periphery of the first recession portion. The light incident surface constitutes a cavity having an opening, and includes a first optically active area, a second optically active area, and an optical path conversion point disposed at a junction therebetween. A center of the baseline of the opening represents an incident origin. The first optically active area is disposed at the center of the light incident surface, and comprises a second recession portion. The second optically active area is a concave surface facing toward the opening of the light incident surface and connected with the first optically active area. In the range of $\theta<\theta_0$, a distance from the incident origin to the light incident surface increases as $\theta$ increases; in the range of $\theta_0 \leq \theta \leq 45°$, the distance from the incident origin to the light incident surface decreases as the angle $\theta$ increases. Wherein, $\theta_0$ is an included angle between the axis of rotational symmetry and a connecting line from the incident origin to the optical path conversion point; $\theta$ represents an included angle between the axis of rotational symmetry and a connecting line from the incident origin to the arbitrary point on the light incident surface. The LED lens satisfies the following conditions:

$$L_t / R_e \leq 0.4 \qquad \text{condition (1)}$$

$$R_{ir} / R_i \leq 0.3 \qquad \text{condition (2)}$$

$$0.6 \leq \frac{\overline{OI_0} \times \tan\theta_0}{S_{ir}} < 1 \qquad \text{condition (3)}$$

wherein, $L_t$ represents a maximum distance from an arbitrary point on the light emitting surface to the light incident surface or to the bottom surface, along the direction parallel with the axis of rotational symmetry; $R_e$ represents a diameter of the light emitting surface; $R_{ir}$ represents a diameter of the light incident surface at the optical path conversion point; $R_i$ represents a diameter of the light incident surface; $\overline{OI_0}$ represents a distance from the incident origin to the point of intersection between the light incident surface and the axis of rotational symmetry; and $S_{ir}$ represents a distance from the optical path conversion point to the point of intersection between the light incident surface and the axis of rotational symmetry along the optical surface of first optically active area.

Further, the LED lens may satisfy the following condition so that light can be further distributed evenly by the light incident surface. In the other hand, the uniformity of light distribution of a light emitting device using the LED lens can be further improved. The light incident surface satisfies the condition (4) can be provided with the first optically active area which can properly redistribute a lambertian light source, such as light emitted from an LED, with more uniform of luminance. In addition, when values of the conditions (2) and (3) are fixed, a light beam assumed emitted from the incident origin and passing through the first optically active area of the light incident surface is refracted to get a lower intensity in the paraxial region as the value of the condition (4) increases.

$$1.01 \leq \frac{\overline{OP_0}}{\overline{OI_0}} \leq 1.1 \qquad \text{condition (4)}$$

wherein, $\overline{OP_0}$ represents a distance from the incident origin to the optical path conversion point; $\overline{OI_0}$ represents the distance from the incident origin to the point of intersection between the light incident surface and the axis of rotational symmetry.

In some embodiments, the LED lens may further satisfy the following condition so that the light emitting surface may further have a proper refractive power to improve light distribution uniformity of a light emitting device using the LED lens.

$$\frac{1}{6} \le \frac{R_{er}}{R_e} \le \frac{5}{12} \qquad \text{condition (5)}$$

wherein, $R_{er}$ represents a diameter of the first recession portion of the light emitting surface, that is, double of a distance from an apex of the light emitting surface to the axis of rotational symmetry along a direction perpendicular to the axis of rotational symmetry; and $R_e$ represents the diameter of the light emitting surface. Wherein, the apex of the light emitting surface 41 is at a maximum distance from the light emitting surface to the plane including the incident origin and perpendicular to the axis of rotational symmetry along the direction parallel with the axis of rotational symmetry. By the condition (5), that is, the diameter of the first recession portion is controlled to be equal to or larger than one sixth of the diameter of the light emitting surface, light emitting from the first recession portion can be properly distributed to prevent light excessive concentration in the paraxial region. Conversely, when the diameter of the first recession portion is controlled to be equal to or smaller than five twelfths of the diameter of the light emitting surface, the relative width of the first recession portion is restricted to prevent light emitting from the first recession portion excessive dispersion so as to get an even light pattern.

In some embodiments, the first optically active area of the light incident surface is a concave surface extending to an apex of the light incident surface from the optical path conversion point toward the light emitting surface, dropping toward a side of the bottom surface from the apex of the light incident surface, and forming a vertex along with the axis of rotational symmetry. That is, a center of curvature of the concave surface of the first optically active area is at the side of the incident origin, such that the concave surface faces toward the incident origin, where is a light source such as an LED assumed to be placed. Wherein, the apex of the light incident surface is at a maximum distance from the light incident surface to the plane including the incident origin and perpendicular to the axis of rotational symmetry along the direction parallel with the axis of rotational symmetry.

In some embodiments, the first optically active area of the light incident surface is a concave surface or a convex surface dropping from the optical path conversion point toward the bottom surface. That is, the first optically active area is the concave/convex surface facing toward the incident origin.

In some embodiments, the first optically active area of the light incident surface constitutes a conical cavity whose surface is oblique to the axis of rotational symmetry, a parabolic cavity having an apex on the axis of rotational symmetry and an opening toward the light emitting surface, or a combination thereof.

In some embodiments, the first recession portion of the light emitting surface is a concave surface dropping from an inner edge of the convex portion toward the light incident surface and forming a vertex along with the axis of rotational symmetry. That is, the first recession portion is the concave surface facing toward the incident origin.

In some embodiments, the first recession portion of the light emitting surface is a convex surface dropping from an inner edge of the convex portion toward the light incident surface. That is, the first recession portion is the convex surface facing toward the incident origin.

Further, the LED lens may comprise a light source fixing part extending down from the bottom surface to fix with a light source such as an LED.

According to the aspect of the present disclosure, a light emitting device comprising the above mentioned LED lens and an LED is further provided. The LED is used to emit a light beam, and is provided with an emitting surface. In one preferred embodiment, the center of the emitting surface of LED may be disposed at the axis of rotational symmetry of the said LED lens. The light beam emitted from the LED generally enters the LED lens through the light incident surface, and then passes through the light emitting surface, so as to form a light pattern having an effective divergence angle of at least 120° taking an optical axis of the light emitting device as center. Where, the effective divergence angle is defined by double of the critical angle corresponding to the half of maximum luminous intensity of the a light emitting device.

In the light emitting device, the emitting surface of the LED may be disposed at, or under a first plane which the first plane is defined as the plane of opening cavity constituted by the light incident surface of the LED lens. Furthermore, in order to ensure light emitted from the LED being refracted and projected by the LED lens, the light emitting device may satisfy the following condition.

$$0 \le d \le 2L_t \qquad \text{condition (6)}$$

wherein, d represents a distance between the first plane and a second plane; in which the second plane is coincided with the emitting surface of the LED; $L_t$ represents a maximum distance from an arbitrary point on the light emitting surface to the light incident surface or the bottom surface along the direction parallel with the axis of rotational symmetry.

In the light emitting device, the emitting surface of the LED may be disposed in the cavity constituted by the light incident surface.

In the light emitting device, the light emitted from the LED may be transmitted through media having lower refractive index than the refractive index of the LED lens, and then enter into the LED lens. In different applications, said media may be air, transparent silicone, or material containing a wavelength conversion component and so on but not limited.

By the above LED lens and the light emitting device using the same, one or more of the following advantages is obtained.

(1) By the present disclosure, a light pattern with improved illumination uniformity and an effective divergence angle of at least 120° can be provided. Particularly, the problem of illumination of a paraxial region of a light pattern significantly different from adjacent region, such as bright spot or dark area can be ease, and the color uniformity of the light emitting device is improved. Moreover, the present disclosure can meet the requirement of illumination uniformity and scattering ability, and effectively reduce the number of the LED light emitting device thereby reducing the volume of a surface light module using LEDs, the heat accumulation in the surface light module and costs. In addition, when the present disclosure is used in a display, it is able to improve quality of the display, to reduce chromatic aberration and to contribute to thinner display.

(2) Furthermore, by optionally adding with the limitations of the conditions (4) or/and (5), which control the light incident surface and the light emitting surface respectively, the LED lens can distribute the light beam more evenly. Therefore, in a paraxial region of a light pattern, the region having different illumination such as bright spot or dark area can be prevented, or be controlled to be difficult to distinguish, for example, to decrease the diameter of the region having different illumination, or to ease the illumination difference thereof. Therefore, a light emitting device with improved illumination uniformity is further easy to be made.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION

The structure and technical features of the present invention will now be described in considerable detail with reference to some embodiments and the accompanying drawings thereof, so that the present invention can be easily understood.

Figure 1:
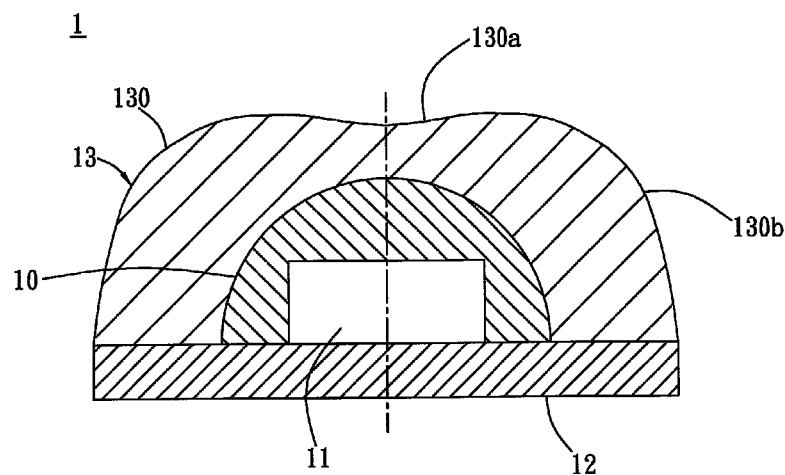
FIG. 1 is a cross-sectional view of a conventional light emitting device.
Figure 2:
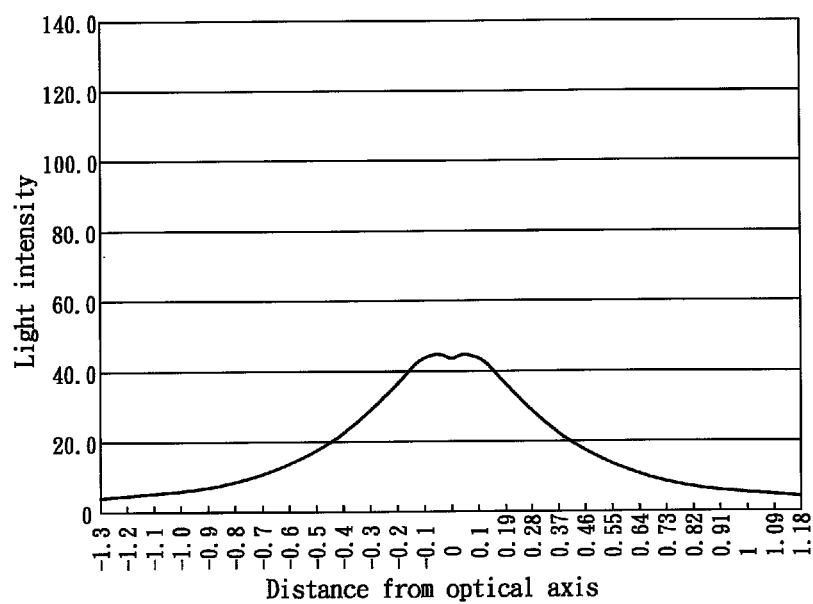
FIG. 2 is a schematic diagram showing an emission intensity distribution of the conventional light emitting device of FIG. 1.
Figure 3:
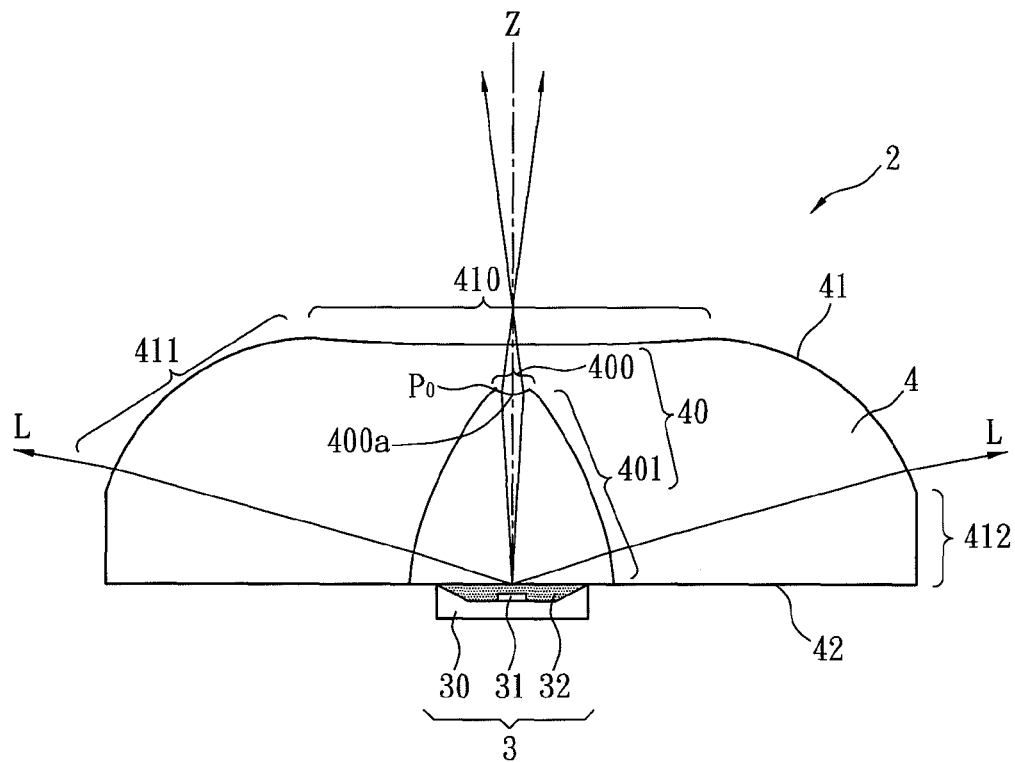
FIG. 3 is a cross-sectional view of a light emitting device according to one embodiment of the present disclosure.

FIG. 3 is a cross-sectional view of a light emitting device according to one embodiment of the present disclosure. The light emitting device 2 of the present disclosure can be applied in an LED backlight module or other illumination devices and includes an LED 3 and an LED lens 4. The LED 3 includes a substrate 30, an LED chip 31, and a fluorescent glue layer 32. The LED chip 31 can be disposed in a recession of the substrate 30, in which the recession of the substrate 30 can be filled with the fluorescent glue layer 32 to cover and fix the LED chip 31 on the substrate 30, so that the opening of the recession of the substrate 30 can be an emitting surface of the LED 3. Additionally, the fluorescent glue layer 32 can be made of silicon oxide resin mixing with a wavelength conversion material such as phosphor.

The LED lens 4 has an axis of rotational symmetry Z, and includes a light incident surface 40, a light emitting surface 41, and a bottom surface 42 extended from the light incident surface 40 and connected to the light emitting surface 41. Further, for enhancing light utilizable efficiency of the light emitting device 2, the bottom surface 42 can be coated with a reflection layer or attached with other materials capable of reflecting light. In some embodiments, to avoid uneven illumination caused by concentrated light after light incident through the bottom surface 42, the bottom surface 42 may be provided with a plurality of irregular projections and irregular dents. An optical axis of the light emitting device 2 indicates a central axis of the three-dimensional a light beam emitted from the light emitting device 2 through the LED lens 4. In the light emitting device 2, the light incident surface 40 of the LED lens 4 may be disposed on the emitting surface of the LED 3. In one embodiment, in the light emitting device 2, the axis of rotational symmetry Z of the LED lens 4 is perpendicular to the emitting surface of the LED 3. For a more precise combined process, the axis of rotational symmetry Z of the LED lens 4 may pass through a geometric center O' of the emitting surface of the LED 3. In some embodiments, the axis of rotational symmetry Z of the LED lens 4 is coincided with a mechanical axis of the LED 3. In the following embodiments, the axis of rotational symmetry Z of the LED lens 4 is coincided with the mechanical axis of the LED 3. As shown in FIG. 3, the LED lens 4 has a shape that can refract the light L from the LED 3 to be away from the optical axis of the light emitting device 2, such that the emission angle of the light emitting device 2 is enhanced.

Figure 4:
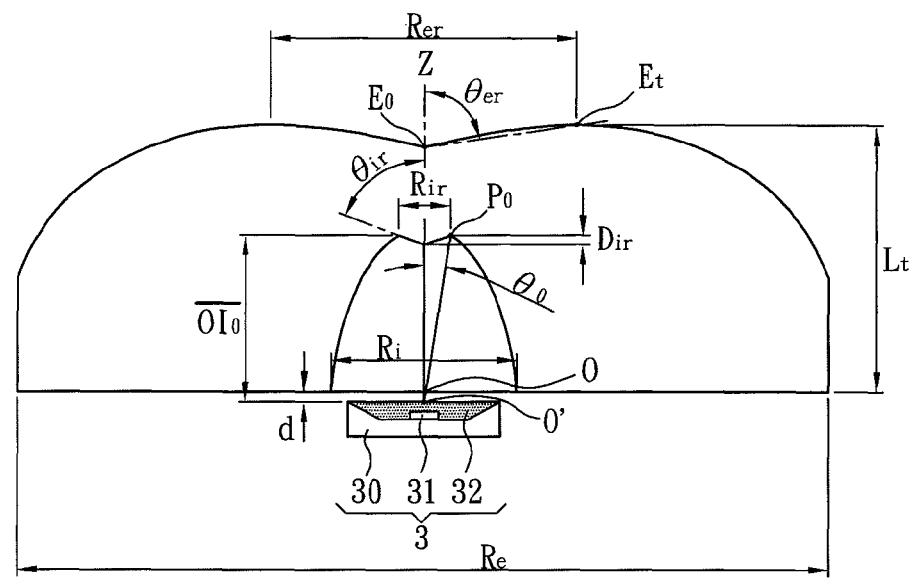
FIG. 4 is a cross-sectional view of a light emitting device according to another embodiment of the present disclosure.
Figure 8:
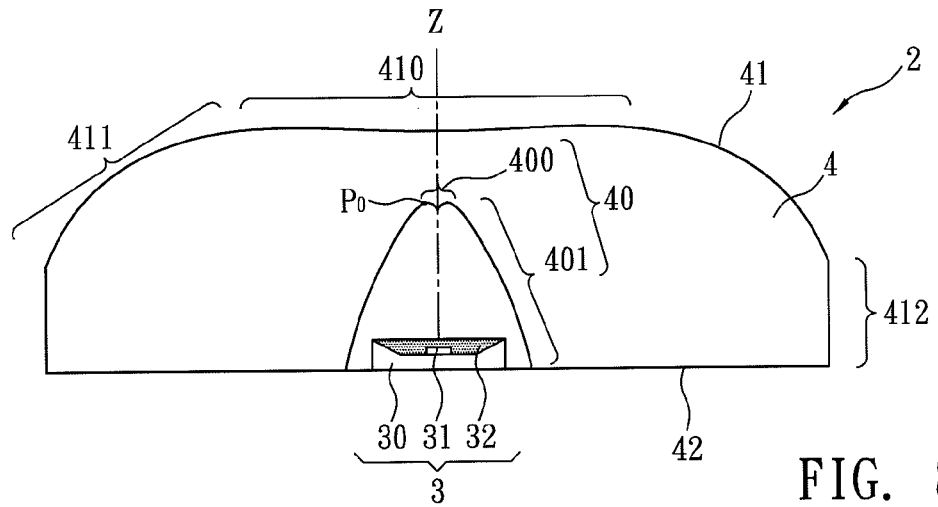
FIG. 8 is a cross-sectional view of a light emitting device of the first example according to the present disclosure.
Figure 9:
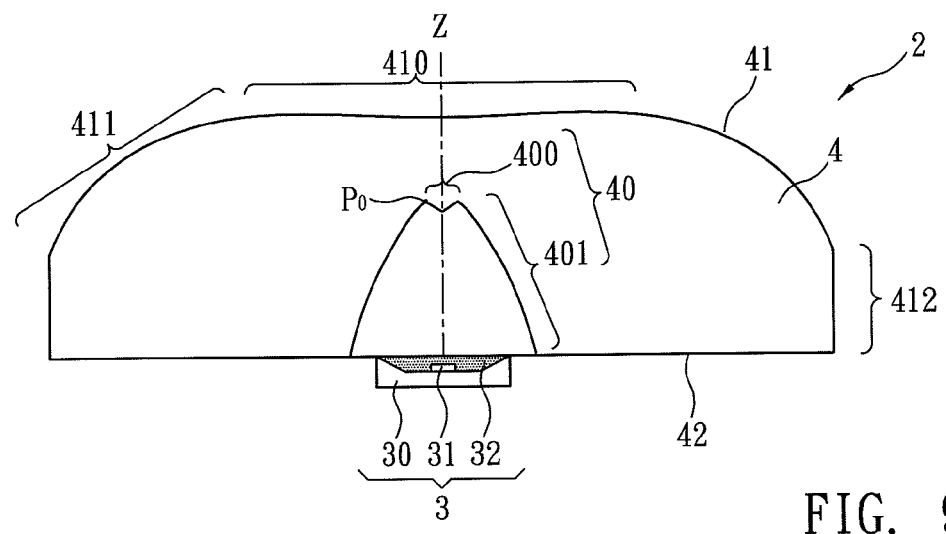
FIG. 9 is a cross-sectional view of a light emitting device of the second example according to the present disclosure.

In a first example, as shown in FIG. 8, the LED 3 may be buried in a cavity constituted by the light incident surface 40 of the LED lens 4. The center of an opening of the cavity constituted by the light incident surface 40 represents an incident origin O. In a second example, as shown in FIG. 9, the geometric center O' of the emitting surface of the LED 3 may be disposed coincided with the incident origin O of the LED lens 4. In some embodiments, as shown in FIG. 4, the geometric center O' of the emitting surface of the LED 3 may be disposed under a first plane where the opening of the cavity constituted by the light incident surface 40 is located. Such an arrangement can improve heat dissipation efficiency of the light emitting device 2. Furthermore, in order to ensure light emitted from the LED 3 will be refracted and projected by the LED lens 4, a space (which the distance is represented by "d") between the first plane and a second plane where the emitting surface of the LED 3 is located, may satisfy the condition (6). For example, in different applications, the space distance d may be ranged one to three times of the thickness of the emitting layer of the LED 3 such as 0.1~0.3 mm. In some embodiments, the gap between the bottom surface 42 and the emitting surface of the LED 3 can be filled with a media having lower refractive index than the refractive index of the LED lens 4. Such media may be, for example, air, transparent silicone, or wavelength conversion component and so on.

The LED lens 4 is preferably made of transparent resin material or a transparent glass. The appropriate transparent resin material may be polymethylmethacrylate (PMMA) having a refraction index of 1.49, polycarbonate (PC) having a refraction index of 1.59, epoxy resin (EP), polylactic acid (PLA) and the like. For a purpose of cost savings, the LED lens 4 can be made from material having a refraction index in the range of 1.49~1.53.

The light emitting surface 41 of the LED lens 4 is an aspheric surface being symmetrical to the axis of rotational symmetry Z; it includes a first recession portion 410 disposed at the center of the light emitting surface 41 and a convex portion 411 connected to the outer periphery of the first recession portion 410. In some embodiments, for helping prevent stray light, the light emitting surface 41 can further comprise a vertical portion 412 approximately parallel with the axis of rotational symmetry Z and connected to the outer periphery of the convex portion 411. Light L is further refracted toward the direction perpendicular to the axis of rotational symmetry Z by the first recession portion 410, such that the luminous intensities in a paraxial region of a light pattern generated by the light emitting device 2 is decreased so as to eliminate the brightness difference in the light pattern. Simultaneously, the light emission angle of the light emitting device 2 is increased. For achieving the main goal of the present disclosure, that is, the light emitting device 2 can provide a light pattern with an effective divergence angle of at least 120°, the light emitting surface 41 should satisfy the condition (1). In a preferred embodiment, the LED lens 4 may further satisfy the condition (5) so that the light emitting surface 41 may further have a proper refractive power to improve light distribution uniformity of a light emitting device 2, and to reduce the generation of bright ring in the light pattern.

Please refer to FIGS. 3 and 4, the symbols related to the light emitting surface 41 are defined as follows:

$E_0$: the point of intersection between the axis of rotational symmetry Z and the first recession portion 410 of the light emitting surface 41; in a preferred embodiment, $E_0$ is also at the optical axis of the light emitting device 2.

$E_t$: an apex of the light emitting surface 41, that is, it is at a maximum distance (which is represented by "$L_t$") from the light emitting surface 41 to the plane including the incident origin O and perpendicular to the axis of rotational symmetry Z along the direction parallel with the axis of rotational symmetry Z; also, it is the junction between the first recession portion 410 and the convex portion 411.

$\theta_{er}$: the included angle between the axis of rotational symmetry Z and a connecting line from the points $E_0$ to $E_t$ of the light emitting surface 41;

$R_{er}$: a diameter of the first recession portion 410 of the light emitting surface 41, that is, double of a distance from the apex ($E_t$) of the light emitting surface 41 to the axis of rotational symmetry Z along a direction perpendicular to the axis of rotational symmetry Z; and $R_e$: a diameter of the light emitting surface 41.

As shown in FIG. 4, the optical surface of the first recession portion 410 of the light emitting surface 41 may be a concave surface facing toward the incident origin O, dropping from an inner edge of the convex portion 411 toward the light incident surface 40 and forming a vertex along with the axis of rotational symmetry Z. In one embodiment, as shown in FIG. 3, the first recession portion 410 of the light emitting surface 41 is a convex surface facing toward the incident origin O, and dropping from an inner edge of the convex portion 411 toward the light incident surface 40.

The light emitting surface 41 of the LED lens 4 of the present disclosure is an aspheric surface being symmetrical to the axis of rotational symmetry Z, in all embodiments of the present disclosure, the aspheric surfaces thereof are defined, but should not be limited to, by an aspheric surface formula as the following equation:

$$Z(h) = \frac{ch^2}{1 + \sqrt{(1-(1+K)c^2h^2)}} + A_2h^2 + A_4h^4 + A_6h^6 + A_8h^8 + A_{10}h^{10} + A_{12}h^{12} + \ldots \quad \text{condition (7)}$$

wherein, $Z(h)$ is the distance (SAG value) from any point on an optical surface of the lens to the tangential plane of the intersection point of the optical surface and an optical axis of the lens along the direction of an optical axis thereof; c is the curvature of the optical surface on the optical axis; h is the distance (height) from any point on an optical surface of the lens to the optical axis along the direction perpendicular to the optical axis of the lens; K is the conic constant, and $A_2 \sim A_N$ are the $2^{th} \sim N^{th}$ order aspherical coefficients. However, it must be noted that the above mentioned aspheric surface formula is merely one of means to express the shape of an aspheric surface; any aspheric surface formula for defining an axially symmetrical aspheric surface should be available to use to define the aspheric surface(s) of the LED lens 4 of the present disclosure.

Figure 5:
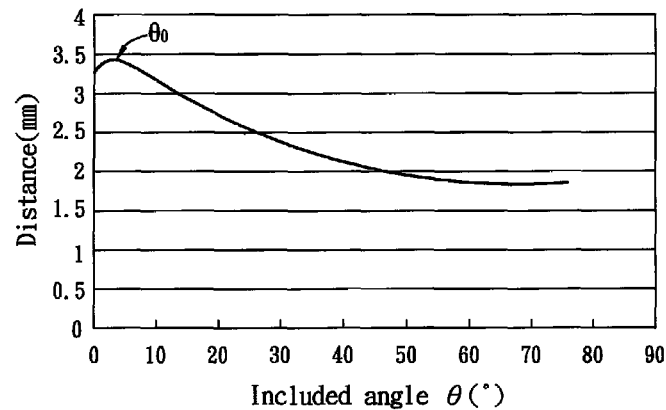
FIG. 5 is a diagram showing a relationship between an included angle θ and a distance from the incident origin to a point on the light incident surface of the light emitting device according to an embodiment of the present disclosure.

The light incident surface 40 of the LED lens 4 constitutes the cavity having the opening; and it includes a first optically active area 400, and a second optically active area 401. There is an optical path conversion point $P_0$ disposed at the junction between the first optically active area 400 and the second optically active area. An included angle between the axis of rotational symmetry Z and a connecting line from the incident origin O to the optical path conversion point $P_0$ is represented by $\theta_0$. The first optically active area 400 is disposed at the center of the light incident surface 40, and comprises a second recession portion 400a. The second recession portion 400a is defined by the region where is surrounded by an apex of light incident surface 40. In the FIG. 4, the distance $D_{ir}$ from the apex of the light incident surface 40 to the plane where is perpendicular to the axis of rotational symmetry Z and passes through a intersection between the light incident surface 40 and the axis of rotational symmetry Z is defined as the depth of the second recession portion 400a. Wherein, there is an included angle $\theta_{ir}$ between the axis of rotational symmetry Z and a connecting line from the apex of the light incident surface 40 to the intersection between the light incident surface 40 and the axis of rotational symmetry Z. An included angle between the axis of rotational symmetry Z and a connecting line from the incident origin O to the arbitrary point on the light incident surface 40 is represented by $\theta$. As shown in FIG. 5, in the range of $\theta < \theta_0$, a distance from the incident origin O to the light incident surface 40 increases as $\theta$ increases. The second optically active area 401 is a concave surface facing toward the opening of the light incident surface 40 and connected with the first optically active area 400. As shown in FIG. 5, in the range of $\theta_0 \leq \theta \leq 45°$, the distance from the incident origin to the light incident surface decreases as the angle $\theta$ increases. Thus, light L respectively incident to the first optically active area 400 and the second optically active area 401 will be refracted with different effect according to each special surface design, and thereby light distribution uniformity and light emission angle would be improved.

The second recession portion 400a can concentrate the light incident on it, such that the light intensity of the central region of the light pattern generated by the light emitting device 2 can be compensated. Therefore, a problem of a central dark area in the central region of a light pattern caused by an LED lens which refracts most of the light beam toward the direction perpendicular to the optical axis for improving the light emission angle can be overcome. However, due to a poor design of the second recession portion 400a will bring about a significantly brighter paraxial region in a light pattern of the light emitting device 2. Therefore, the present disclosure has to satisfy the conditions (2) and (3) in order to provide a light pattern with both two advantages of high light-scattering ability and high uniformity of light distribution. Further, in an optional embodiment, in order to prevent light excessive concentration in the paraxial region, the second recession portion 400a may be provided with micro-structures. Wherein, the aspect ratio of each micro-structure is too small to affect the distance from the incident origin O to the second recession portion 400a. For example, micro-structures may be selected from, but is not limited to, the group consisting of Fresnel structure, conical array structure, sandblast structure, groove array structure or irregular surfaces, and combinations thereof.

Further, for easily making the LED lens 4 of the present disclosure, and improving light distribution uniformity of the light emitting device 2, in a preferred embodiment, the LED lens 4 may further satisfy the condition (4). By the condition (4), a more detailed optical structure of the light incident surface 40 of the LED lens 4 is provided by limiting the range of the ratio between the maximum distance $(\overline{OP_0})$ and the minimum distance $(\overline{OI_0})$ from the incident origin O to the first optically active area 400.

Figure 14:
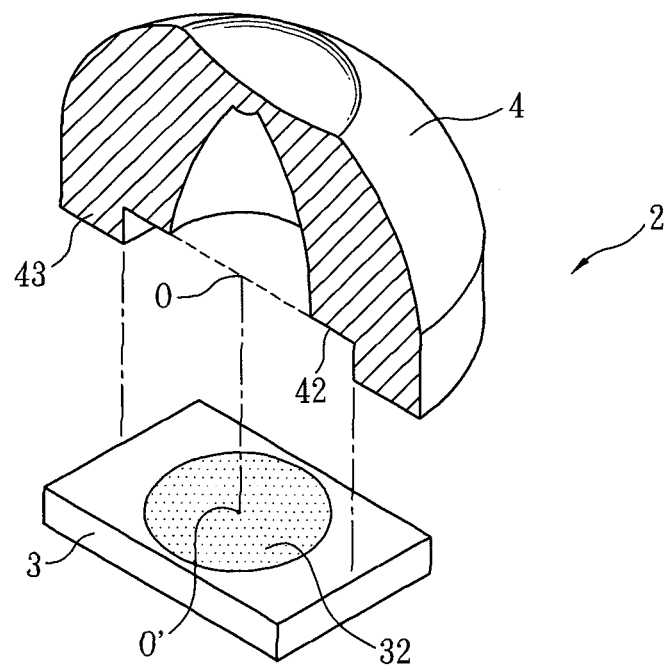
FIG. 14 is an exploded view of a light emitting device of another embodiment according to the present disclosure.

In some embodiments, the diameter of the opening, which diameter is represented by $R_i$, constituted by the light incident surface 40 faces to the LED 3 in the light emitting device 2. Wherein, the diameter of the opening may be equal to or slightly larger than the diameter of the emitting surface of the LED 3. As shown in FIG. 14, for efficiently assembling the LED lens 4 and the LED 3, and providing a space for installation tolerance of the LED lens 4 and the LED 3, the LED lens 4 may comprise a light source fixing part 43 extending down from the bottom surface to fix with the LED 3. For enhancing the light emission angle of the light emitting device 2, light L emitted from the LED 3 is transmitted through media having lower refractive index than the refractive index of the LED lens 4, and then is sequentially incident to the light incident surface 40 and the light emitting surface 41 of the LED lens 4. In different applications, said media can be air, transparent silicone, or wavelength conversion component and so on but not limited to. To facilitate comparison, said media is an air gap in each of the following embodiments.

In the light incident surface 40, an optical surface of the second recession portion 400a of the first optically active area 400 may be selected from a group consisting of a spherical surface, an aspherical, a parabolic surface, a flat surface, and a combination thereof. In some embodiments, the first optically active area 400 of the light incident surface 40 may constitute a conical cavity whose surface is oblique to the axis of rotational symmetry Z (not shown). In the followings, the first optically active area 400 is defined as a convex surface or a concave surface corresponding to the incident origin O. In one embodiment, as shown in FIG. 8, the first optically active area 400 of the light incident surface 40 is a concave surface extending to the apex of the light incident surface 40 from the optical path conversion point $P_0$ toward the light emitting surface 41, dropping toward a side of the bottom surface 42 from the apex of the light incident surface 40, and forming a vertex along with the axis of rotational symmetry Z. In some embodiments, as shown in FIG. 9 to FIG. 12, the first optically active area 400 of the light incident surface 40 is a concave surface dropping from the optical path conversion point $P_0$ toward the bottom surface 42 and forming a vertex along with the axis of rotational symmetry Z. In some embodiments, the first optically active area 400 of the light incident surface 40 is a convex surface dropping from the optical path conversion point $P_0$ toward the bottom surface 42. For example, but is not limited to, as shown in FIG. 13, the first optically active area 400 of the light incident surface 40 may constitute a parabolic cavity having an apex on the axis of rotational symmetry Z and an opening toward the light emitting surface 41. In practically, the convex surface of the first optically active area 400 is provided with a shape depending on the requirement of optical effect.

Figure 6:
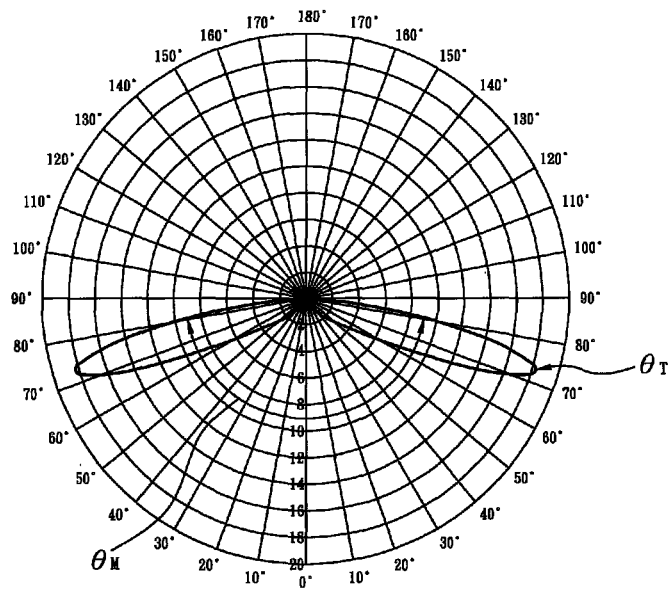
FIG. 6 is a schematic diagram showing a polar candela distribution plot of the light emitting device of the present disclosure.

FIG. 6 is a diagram showing a polar candela distribution plot of the light emitting device 2 that shows a luminous intensity distribution above the light emitting surface 41 of the light emitting device 2. In the center region of the luminous intensity distribution generated by the light emitting device 2, the amount of the luminous flux of each solid angle is smaller than 2 candela (cd). In the outer region where an included angle between an outgoing light beam and the optical axis is larger than 40°, the value of candela increases abruptly as the included angle increases. In this embodiment, an included angle ($\theta_T$) between the axis of rotational symmetry Z and a connecting line from the center of the emitting surface of the LED 3 (O') to the peak of the luminous intensity of a light pattern is about 72°. The effective divergence angle ($\theta_M$) of the light emitting device 2 is about 150°, in which the effective divergence angle ($\theta_M$) is defined by double of the critical angle corresponding to the half of maximum luminous intensity.

Figure 7:
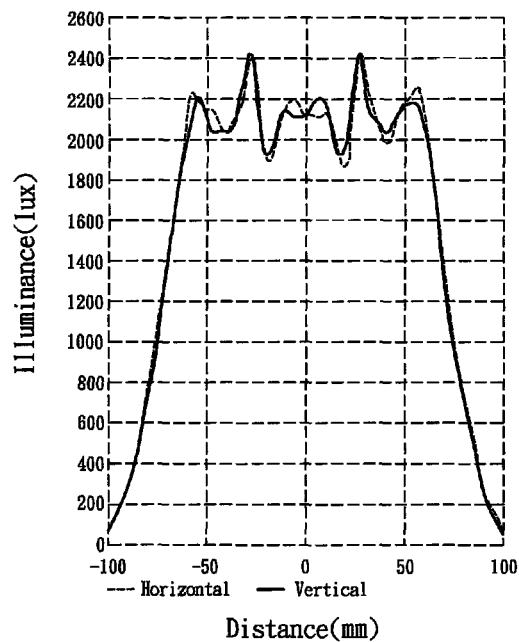
FIG. 7 is a schematic diagram showing an illumination curve on a sampling plane irradiated by the light emitting device of the present disclosure.

FIG. 7 is a diagram showing an illumination curve on a sheet with a size of 100 mm×100 mm irradiated by the light emitting device 2 of the present disclosure with an interval of 22.5 mm. As shown in the illumination curve, the difference between the maximum illumination and the average illumination as well as the difference between the minimum illumination and the average illumination are small, that is, the light emitting device 2 has good illumination uniformity, and is conductive to use in a thin-type illumination device, such as a display.

In order to illustrate embodiments derived according to main technical characteristics of the present disclosure, six types of the LED lenses 4 are set forth in the followings. In each following example, the diameter of the emitting surface of the LED 3 is about 2.1 mm, but is not limited to. In addition, the sizes, coefficients, factors, as well as other properties according to the light emitting device 2 listed below are only provided for description purpose and should not be used to limit the range of the present disclosure. It must be noted that the following embodiments satisfying condition (1) to condition (5) are chosen for illustrating and should not be misunderstood that all of conditions must be met to achieve the goal of the present disclosure.

First Example

FIG. 8 is a cross-sectional view illustrating a light emitting device of the first example according to the present disclosure. In the first example, the light emitting surface 41 of the LED lens 4 has a shape according to table (1) listed below that shows coefficients of the aspheric surface formula (7).

TABLE (1)

| curvature (c) | K | $A_2$ | $A_4$ | $A_6$ | $A_8$ | $A_{10}$ | $A_{12}$ |
|---|---|---|---|---|---|---|---|
| −6.42E+12 | −2.23E+06 | 2.01E−02 | −1.44E−03 | 2.08E−05 | −4.89E−07 | 9.44E−09 | −9.54E−11 |

In Table (2) listed below, it shows the refractive index ($N_d$) of the LED lens 4, the data referred to FIG. 4, and the space distance (d) between the first plane and the second plane is located in the first example.

TABLE (2)

| $L_t$ (mm) | $R_e$ (mm) | $R_{er}$ (mm) | $\tan\theta_{er}$ | $R_i$ (mm) | $R_{ir}$ (mm) | $\overline{OI_0}$ (mm) | $\theta_T$ (°) |
|---|---|---|---|---|---|---|---|
| 4.694 | 15.200 | 5.660 | 12.926 | 3.500 | 0.468 | 2.250 | 71 |

| $\tan\theta_0$ | $S_{ir}$ (mm) | $\overline{OP_0}$ (mm) | $D_{ir}$ (mm) | $\tan\theta_{ir}$ | d (mm) | $N_d$ | $\theta_M$ (°) |
|---|---|---|---|---|---|---|---|
| 0.097 | 0.311 | 2.425 | 0.164 | 1.430 | −0.800 | 1.49 | 156 |

In the first example, the first optically active area 400 of the light incident surface 40 is a concave surface. For detail description of the concave surface of the light incident surface 40, it extends to the apex of the light incident surface 40 from the optical path conversion point $P_0$ toward the light emitting surface 41, and then drops toward the side of the bottom surface 42 to form a vertex along with the axis of rotational symmetry Z. The first recession portion 410 of the light emitting surface 41 is a convex surface facing toward the incident origin O, and dropping from an inner edge of the convex portion 411 toward the light incident surface 40, in which, a slope of the tangent of the first recession portion 410 at the paraxial region approaches zero. The space distance (d) is negative to represent that the LED 3 is buried in a cavity constituted by the light incident surface 40 of the LED lens 4. The others main technical features about the light incident surface 40 and the light emitting surface 41 according to the LED lens 4 of the present disclosure are disclosed in the previous paragraphs, therefore the same description about the LED lens 4 is omitted herein.

In the first example, the values of the condition (1) to the condition (5) are calculated and shown below.

$$L_t / R_e = 0.309$$

$$\frac{\overline{OP_0}}{\overline{OI_0}} = 1.078$$

$$R_{ir} / R_i = 0.134$$

-continued $$\frac{R_{er}}{R_e} = 0.372$$

-continued $$\frac{\overline{OI_0} \times \tan\theta_0}{S_{ir}} = 0.702$$

Therefore, the LED lens 4 of this example satisfies the condition (1) to the condition (5), such that the light beam from the LED 3 can be distributed widely and evenly to constitute the light emitting device 2 provided for light having high illumination uniformity, high scattering ability as well as low chromatic aberration.

Second Example

FIG. 9 is a cross-sectional view illustrating a light emitting device of the second example according to the present disclosure. In the second example, the light emitting surface 41 of the LED lens 4 has a shape according to table (3) listed below that shows coefficients of the aspheric surface formula (7).

TABLE (3)

| curvature (c) | K | $A_2$ | $A_4$ | $A_6$ | $A_8$ | $A_{10}$ | $A_{12}$ |
|---|---|---|---|---|---|---|---|
| −6.42E+12 | −2.23E+06 | 2.01E−02 | −1.44E−03 | 2.08E−05 | −4.89E−07 | 9.44E−09 | −9.54E−11 |

In Table (4) listed below, it shows the refractive index ($N_d$) of the LED lens 4, the data referred to FIG. 4, and the space distance (d) in the second example.

TABLE (4)

| $L_t$ (mm) | $R_e$ (mm) | $R_{er}$ (mm) | $\tan\theta_{er}$ | $R_i$ (mm) | $R_{ir}$ (mm) | $\overline{OI_0}$ (mm) | $\theta_T$ (°) |
|---|---|---|---|---|---|---|---|
| 4.726 | 15.500 | 5.360 | 35.384 | 3.600 | 0.620 | 2.745 | 70 |
| $\tan\theta_0$ | $S_{ir}$ (mm) | $\overline{OP_0}$ (mm) | $D_{ir}$ (mm) | $\tan\theta_{ir}$ | d (mm) | $N_d$ | $\theta_M$ (°) |
| 0.105 | 0.370 | 2.961 | 0.200 | 1.553 | 0.000 | 1.49 | 156 |

In the second example, the first optically active area 400 of the light incident surface 40 is a concave surface. For detail description of the concave surface of the light incident surface 40, it drops from the optical path conversion point $P_0$ toward the bottom surface 42 and forming a vertex along with the axis of rotational symmetry Z. The space distance (d) is zero to represent that the emitting surface of the LED 3 is disposed coincided with the first plane. The others main technical features about the light incident surface 40 and the light emitting surface 41 according to the LED lens 4 of the present disclosure are disclosed in the previous paragraphs, therefore the same description about the LED lens 4 is omitted herein.

In the second example, the values of the condition (1) to condition (5) are calculated and shown below.

$$L_t / R_e = 0.305$$

$$\frac{\overline{OP_0}}{\overline{OI_0}} = 1.079$$

$$R_{ir} / R_i = 0.172$$

$$\frac{R_{er}}{R_e} = 0.346$$

$$\frac{\overline{OI_0} \times \tan\theta_0}{S_{ir}} = 0.780$$

Therefore, the LED lens 4 of this example satisfies the condition (1) to the condition (6), such that the light beam from the LED 3 can be distributed widely and evenly to constitute the light emitting device 2 provided for light having high illumination uniformity, high scattering ability as well as low chromatic aberration.

Third Example

Figure 10:
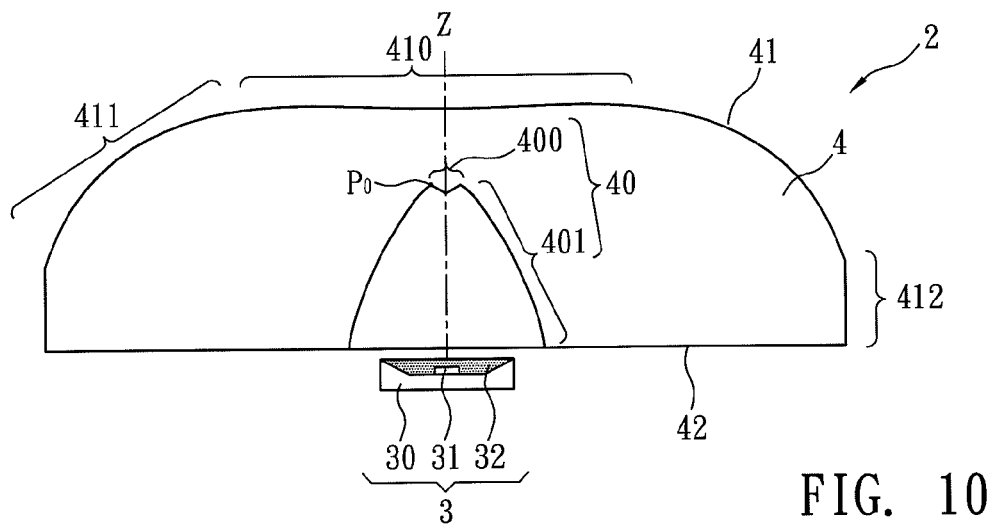
FIG. 10 is a cross-sectional view of a light emitting device of the third example according to the present disclosure.

FIG. 10 is a cross-sectional view illustrating a light emitting device of the third example according to the present disclosure. In the third example, the light emitting surface 41 of the LED lens 4 has a shape according to table (5) listed below that shows coefficients of the aspheric surface formula (7).

TABLE (5)

| curvature (c) | K | $A_2$ | $A_4$ | $A_6$ | $A_8$ | $A_{10}$ | $A_{12}$ |
|---|---|---|---|---|---|---|---|
| −6.42E+12 | −2.23E+06 | 2.01E−02 | −1.44E−03 | 2.08E−05 | −4.89E−07 | 9.44E−09 | −9.54E−11 |

In Table (6) listed below, it shows the refractive index ($N_d$) of the LED lens 4, the data referred to FIG. 4, and the space distance (d) in the third example.

TABLE (6)

| $L_t$ (mm) | $R_e$ (mm) | $R_{er}$ (mm) | $\tan\theta_{er}$ | $R_i$ (mm) | $R_{ir}$ (mm) | $\overline{OI_0}$ (mm) | $\theta_T$ (°) |
|---|---|---|---|---|---|---|---|
| 4.694 | 15.500 | 5.360 | 49.604 | 3.800 | 0.616 | 3.194 | 71 |
| $\tan\theta_0$ | $S_{ir}$ (mm) | $\overline{OP_0}$ (mm) | $D_{ir}$ (mm) | $\tan\theta_{ir}$ | d (mm) | $N_d$ | $\theta m$ (°) |
| 0.092 | 0.344 | 3.362 | 0.154 | 1.999 | 0.200 | 1.49 | 156 |

In the third example, the first optically active area 400 of the light incident surface 40 is a concave surface. For detail description of the concave surface of the light incident surface 40, it drops from the optical path conversion point $P_0$ toward the bottom surface 42 and forming a vertex along with the axis of rotational symmetry Z. The others main technical features about the light incident surface 40 and the light emitting surface 41 according to the LED lens 4 of the present disclosure are disclosed in the previous paragraphs, therefore the same description about the LED lens 4 is omitted herein.

In the third example, the values of the condition (1) to condition (5) are calculated and shown below.

$$L_t / R_e = 0.303$$

$$\frac{\overline{OP_0}}{\overline{OI_0}} = 1.053$$

$$R_{ir} / R_i = 0.162$$

$$\frac{R_{er}}{R_e} = 0.346$$

$$\frac{\overline{OI_0} \times \tan\theta_0}{S_{ir}} = 0.853$$

Therefore, the LED lens 4 of this example satisfies the condition (1) to the condition (6), such that the light beam from the LED 3 can be distributed widely and evenly to constitute the light emitting device 2 provided for light having high illumination uniformity, high scattering ability as well as low chromatic aberration.

Fourth Example

Figure 11:
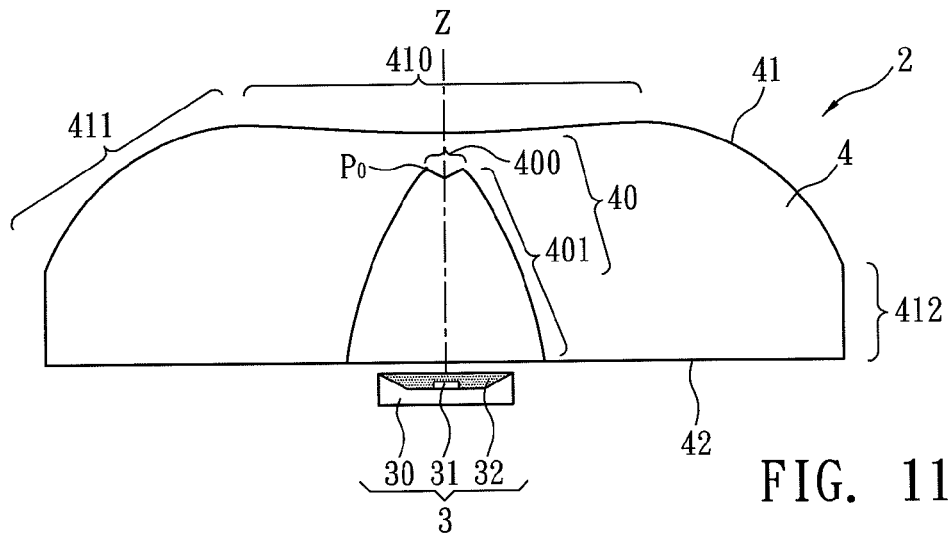
FIG. 11 is a cross-sectional view of a light emitting device of the fourth example according to the present disclosure.

FIG. 11 is a cross-sectional view illustrating a light emitting device of the fourth example according to the present disclosure. In the fourth example, the light emitting surface 41 of the LED lens 4 has a shape according to table (7) listed below that shows coefficients of the aspheric surface formula (7).

TABLE (7)

| curvature (c) | K | $A_2$ | $A_4$ | $A_6$ | $A_8$ | $A_{10}$ | $A_{12}$ |
|---|---|---|---|---|---|---|---|
| −6.42E+12 | −1.66E+03 | 1.93E−02 | −1.44E−03 | 2.08E−05 | −4.89E−07 | 9.44E−09 | −9.54E−11 |

In Table (8) listed below, it shows the refractive index ($N_d$) of the LED lens 4, the data referred to FIG. 4, and the space distance (d) in the fourth example.

TABLE (8)

| $L_t$ (mm) | $R_e$ (mm) | $R_{er}$ (mm) | $\tan\theta_{er}$ | $R_i$ (mm) | $R_{ir}$ (mm) | $\overline{OI_0}$ (mm) | $\theta_T$ (°) |
|---|---|---|---|---|---|---|---|
| 4.592 | 15.500 | 4.640 | 291.596 | 3.770 | 0.712 | 3.655 | 72 |

| $\tan\theta_0$ | $S_{ir}$ (mm) | $\overline{OP_0}$ (mm) | $D_{ir}$ (mm) | $\tan\theta_{ir}$ | d (mm) | $N_d$ | $\theta_M$ (°) |
|---|---|---|---|---|---|---|---|
| 0.093 | 0.402 | 3.858 | 0.187 | 1.905 | 0.200 | 1.51 | 160 |

In the fourth example, the first optically active area 400 of the light incident surface 40 is a concave surface. For detail description of the concave surface of the light incident surface 40, it drops from the optical path conversion point $P_0$ toward the bottom surface 42 and forming a vertex along with the axis of rotational symmetry Z. The others main technical features about the light incident surface 40 and the light emitting surface 41 according to the LED lens 4 of the present disclosure are disclosed in the previous paragraphs, therefore the same description about the LED lens 4 is omitted herein.

In the fourth example, the values of the condition (1) to condition (5) are calculated and shown below.

$$L_t / R_e = 0.296$$

$$\frac{\overline{OP_0}}{\overline{OI_0}} = 1.056$$

$$R_{ir} / R_i = 0.189$$

$$\frac{R_{er}}{R_e} = 0.299$$

$$\frac{\overline{OI_0} \times \tan\theta_0}{S_{ir}} = 0.842$$

Therefore, the LED lens 4 of this example satisfies the condition (1) to the condition (6), such that the light beam from the LED 3 can be distributed widely and evenly to constitute the light emitting device 2 provided for light having high illumination uniformity, high scattering ability as well as low chromatic aberration.

Fifth Example

Figure 12:
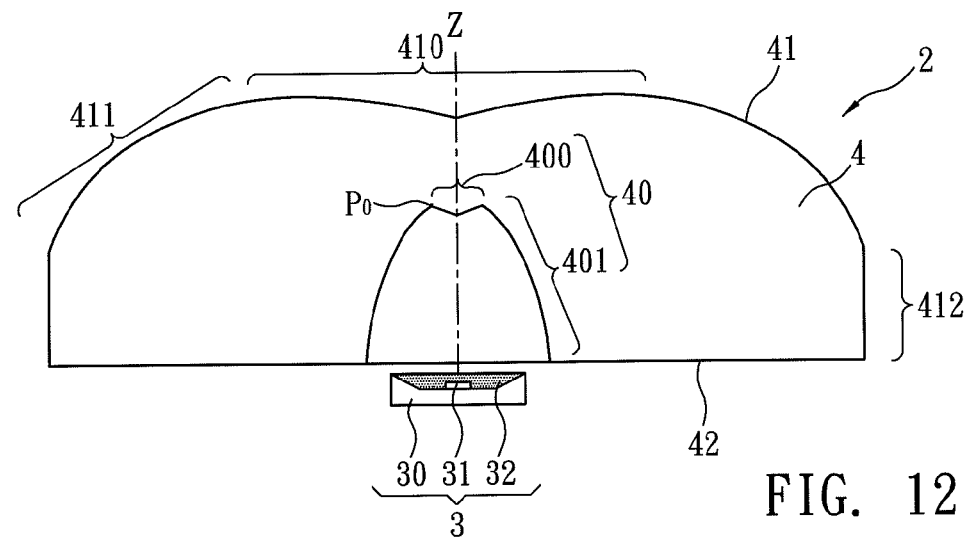
FIG. 12 is a cross-sectional view of a light emitting device of the fifth example according to the present disclosure.
Figure 13:
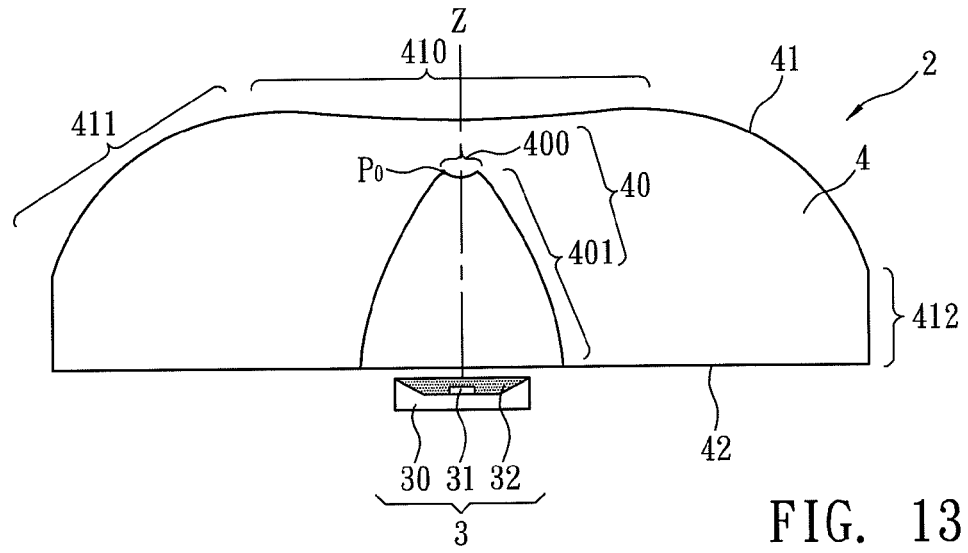
FIG. 13 is a cross-sectional view of a light emitting device of the sixth example according to the present disclosure.

FIG. 12 is a cross-sectional view illustrating a light emitting device of the fourth example according to the present disclosure. In the fifth example, the light emitting surface 41 of the LED lens 4 has a shape according to table (9) listed below that shows coefficients of the aspheric surface formula (7).

TABLE (9)

| curvature (c) | K | $A_2$ | $A_4$ | $A_6$ | $A_8$ | $A_{10}$ | $A_{12}$ |
|---|---|---|---|---|---|---|---|
| 6.42E+12 | −2.00E+01 | −2.58E−02 | −1.11E−03 | 2.31E−05 | −4.85E−07 | 9.44E−09 | −9.54E−11 |

In Table (10) listed below, it shows the refractive index ($N_d$) of the LED lens 4, the data referred to FIG. 4, and the space distance (d) in the fifth example.

TABLE (10)

| $L_t$ (mm) | $R_e$ (mm) | $R_{er}$ (mm) | $\tan\theta_{er}$ | $R_i$ (mm) | $R_{ir}$ (mm) | $\overline{OI_0}$ (mm) | $\theta_T$ (°) |
|---|---|---|---|---|---|---|---|
| 5.032 | 15.500 | 5.720 | 7.496 | 3.500 | 0.712 | 2.999 | 70 |
| $\tan\theta_0$ | $S_{ir}$ (mm) | $\overline{OP_0}$ (mm) | $D_{ir}$ (mm) | $\tan\theta_{ir}$ | d (mm) | $N_d$ | $\theta_M$ (°) |
| 0.148 | 0.509 | 3.226 | 0.192 | 1.858 | 0.200 | 1.53 | 156 |

In the fifth example, the first optically active area 400 of the light incident surface 40 is a concave surface. For detail description of the concave surface of the light incident surface 40, it drops from the optical path conversion point $P_0$ toward the bottom surface 42 and forming a vertex along with the axis of rotational symmetry Z. The optical surface of the first recession portion 410 of the light emitting surface 41 is a concave surface facing toward the incident origin O. For detail description of the concave surface of the light emitting surface 41, it drops from an inner edge of the convex portion 411 toward the light incident surface 40 and then forms a vertex along with the axis of rotational symmetry Z. The others main technical features about the light incident surface 40 and the light emitting surface 41 according to the LED lens 4 of the present disclosure are disclosed in the previous paragraphs, therefore the same description about the LED lens 4 is omitted herein.

In the fifth example, the values of the condition (1) to condition (5) are calculated and shown below.

$$L_t / R_e = 0.325$$

$$\frac{\overline{OP_0}}{\overline{OI_0}} = 1.075$$

$$R_{ir} / R_i = 0.203$$

$$\frac{R_{er}}{R_e} = 0.369$$

$$\frac{\overline{OI_0} \times \tan\theta_0}{S_{ir}} = 0.871$$

Therefore, the LED lens 4 of this example satisfies the condition (1) to the condition (6), such that the light beam from the LED 3 can be distributed widely and evenly to constitute the light emitting device 2 provided for light having high illumination uniformity, high scattering ability as well as low chromatic aberration.

Sixth Example

FIG. 13 is a cross-sectional view illustrating a light emitting device of the fourth example according to the present disclosure. In the sixth example, the light emitting surface 41 of the LED lens 4 has a shape according to table (11) listed below that shows coefficients of the aspheric surface formula (7).

TABLE (11)

| curvature (c) | K | $A_2$ | $A_4$ | $A_6$ | $A_8$ | $A_{10}$ | $A_{12}$ |
|---|---|---|---|---|---|---|---|
| 4.55E−02 | 6.29E+00 | −1.68E−02 | −1.36E−03 | 2.06E−05 | −4.81E−07 | 8.82E−09 | −9.54E−11 |

In Table (12) listed below, it shows the refractive index ($N_d$) of the LED lens 4, the data referred to FIG. 4, and the space distance (d) in the sixth example.

TABLE (12)

| $L_t$ (mm) | $R_e$ (mm) | $R_{er}$ (mm) | $\tan\theta_{er}$ | $R_i$ (mm) | $R_{ir}$ (mm) | $\overline{OI_0}$ (mm) | $\theta_T$ (°) |
|---|---|---|---|---|---|---|---|
| 5.017 | 15.500 | 3.140 | 217.854 | 3.860 | 0.650 | 3.800 | 71 |
| $\tan\theta_0$ | $S_{ir}$ (mm) | $\overline{OP_0}$ (mm) | $D_{ir}$ (mm) | $\tan\theta_{ir}$ | d (mm) | $N_d$ | $\theta_M$ (°) |
| 0.083 | 0.347 | 3.916 | 0.102 | 3.174 | 0.200 | 1.49 | 158 |

In the sixth example, the first optically active area 400 of the light incident surface 40 constitutes a parabolic cavity having an apex on the axis of rotational symmetry Z and an opening toward the light emitting surface 41. The first recession portion 410 of the light emitting surface 41 is a convex surface facing toward the incident origin O, and dropping from an inner edge of the convex portion 411 toward the light incident surface 40, in which, a slope of the tangent of the first recession portion 410 at the paraxial region approaches zero. The others main technical features about the light incident surface 40 and the light emitting surface 41 according to the LED lens 4 of the present disclosure are disclosed in the previous paragraphs, therefore the same description about the LED lens 4 is omitted herein.

In the sixth example, the values of the condition (1) to condition (5) are calculated and shown below.

$$L_t / R_e = 0.324$$

$$\frac{\overline{OP_0}}{\overline{OI_0}} = 1.031$$

$$R_{ir} / R_i = 0.168$$

$$\frac{R_{er}}{R_e} = 0.203$$

$$\frac{\overline{OI_0} \times \tan\theta_0}{S_{ir}} = 0.913$$

Therefore, the LED lens 4 of this example satisfies the condition (1) to the condition (6), such that the light beam from the LED 3 can be distributed widely and evenly to constitute the light emitting device 2 provided for light having high illumination uniformity, high scattering ability as well as low chromatic aberration.

In summary, by the LED lens 4 and the light emitting device 2 using the same according to the present invention, a light pattern with improved illumination uniformity and an effective divergence angle of at least 120° is provided. Whereby, a display using the present invention can have better display quality, less chromatic aberration. Furthermore, due to the improved light emission angle and light distribution uniformity, the demand quantity of the LED light emitting device in a display or an illumination device is reduced, such that the volume of the LED backlight, the heat accumulation in the related device and costs are reduced. Moreover, by optionally limiting one of the condition (4) to condition (6) or a combination thereof, the light emitting device of the present invention can further provide a light pattern with better light distribution uniformity. In particular, the luminance of the center region in the light pattern generated by the light emitting device can be efficiently adjusted, such that the divergence angle, the light distribution uniformity of the light pattern generated by the light emitting device is further enhanced and chromatic aberration of the light pattern is corrected, thus the light emitting device is conducive to use in a thin-type illumination device, such as a display.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. An LED lens having an axis of rotational symmetry, comprising:
    a light emitting surface being an aspheric surface including a first recession portion disposed at the center of the light emitting surface, and a convex portion connected to the outer periphery of the first recession portion;
    a light incident surface constituting a cavity having an opening, wherein a center of the baseline of the opening represents an incident origin, the light incident surface including:
        a first optically active area being disposed at a center of the light incident surface, wherein the first optically active area comprises a second recession portion;
        a second optically active area connected with the first optically active area, wherein the second optically active area forms a concave surface facing toward the incident origin; and
        an optical path conversion point disposed at a junction between the first optically active area and the second optically active area; and
    a bottom surface extended from the light incident surface and connected to the light emitting surface;
    wherein the LED lens satisfies the following conditions:

$$L_t / R_e \leq 0.4;$$

$$R_{ir} / R_i \leq 0.3;$$

and $$0.6 \leq \frac{\overline{OI_0} \times \tan\theta_0}{S_{ir}} < 1;$$

wherein, $L_t$ represents a maximum distance from an arbitrary point on the light emitting surface to the light incident surface or the bottom surface along the direction parallel with the axis of rotational symmetry; $R_e$ represents a diameter of the light emitting surface; $R_{ir}$ represents a diameter of the light incident surface at the optical path conversion point; $R_i$ represents a diameter of the light incident surface; $\overline{OI_0}$ represents a distance from the incident origin to the point of intersection between the light incident surface and the axis of rotational symmetry; $\theta_0$ represents an included angle between the axis of rotational symmetry and a connecting line from the incident origin to the optical path conversion point; and $S_{ir}$ represents a distance from the optical path conversion point to the point of intersection between the light incident surface and the axis of rotational symmetry along the optical surface of first optically active area;
wherein, $\theta$ represents an included angle between the axis of rotational symmetry and a connecting line from the incident origin to the arbitrary point on the light incident surface; wherein, in the range of $\theta < \theta_0$, a distance from the incident origin to the light incident surface increases as $\theta$ increases; wherein, in the range of $\theta_0 \leq \theta \leq 45°$, the distance from the incident origin to the light incident surface decreases as the angle $\theta$ increases.

2. The LED lens as claimed in claim 1, further satisfying the following condition:

$$1.01 \leq \frac{\overline{OP_0}}{\overline{OI_0}} \leq 1.1$$

wherein, $\overline{OP_0}$ represents a distance from the incident origin to the optical path conversion point; $\overline{OI_0}$ represents the distance from the incident origin to the point of intersection between the light incident surface and the axis of rotational symmetry.

3. The LED lens as claimed in claim 1, further satisfying the following condition:

$$\frac{1}{6} \leq \frac{R_{er}}{R_e} \leq \frac{5}{12}$$

wherein, $R_{er}$ represents a diameter of the first recession portion of the light emitting surface; $R_e$ represents the diameter of the light emitting surface.

4. The LED lens as claimed in claim 1, wherein an optical surface of the second recession portion of the first optically active area is selected from a group consisting of a spherical surface, an aspherical, surface, a parabolic surface, a flat surface, and a combination thereof.

5. The LED lens as claimed in claim 1, wherein the first optically active area of the light incident surface is a concave surface extending to an apex of the light incident surface from the optical path conversion point toward the light emitting surface, dropping toward a side of the bottom surface from the apex of the light incident surface, and forming a vertex along with the axis of rotational symmetry.

6. The LED lens as claimed in claim 1, wherein the first optically active area of the light incident surface is a concave surface dropping from the optical path conversion point toward the bottom surface, and forming a vertex along with the axis of rotational symmetry.

7. The LED lens as claimed in claim 1, wherein the first optically active area of the light incident surface is a convex surface dropping from the optical path conversion point toward the bottom surface.

8. The LED lens as claimed in claim 1, wherein the first optically active area of the light incident surface constitutes a conical cavity whose surface is oblique to the axis of rotational symmetry, a parabolic cavity having an apex on the axis of rotational symmetry and an opening toward the light emitting surface, or a combination thereof.

9. The LED lens as claimed in claim 1, wherein the first recession portion of the light emitting surface is a concave surface dropping from an inner edge of the convex portion toward the light incident surface and forming a vertex along with the axis of rotational symmetry.

10. The LED lens as claimed in claim 1, wherein the first recession portion of the light emitting surface is a convex surface dropping from an inner edge of the convex portion toward the light incident surface.

11. The LED lens as claimed in claim 1, further comprising a light source fixing part extending down from the bottom surface to fix a light source.

12. A light emitting device, comprising:
an LED being provided with an emitting surface emitting a light beam;
an LED lens according to claim 1;
wherein the light beam emitted from the LED enters the light incident surface of the LED lens, and then passes through the light emitting surface of the LED lens, thereby forming a light pattern having an effective divergence angle of at least 120°.

13. The light emitting device as claimed in claim 12, wherein the first optically active area of the light incident surface is a convex surface dropping from the optical path conversion point toward the bottom surface.

14. The light emitting device as claimed in claim 12, further satisfying the following condition:

$$1.01 \leq \frac{\overline{OP_0}}{\overline{OI_0}} \leq 1.1$$

wherein, $\overline{OP_0}$ represents a distance from the incident origin to the optical path conversion point; $\overline{OI_0}$ represents the distance from the incident origin to the point of intersection between the light incident surface and the axis of rotational symmetry.

15. The light emitting device as claimed in claim 12, further satisfying the following condition:

$$\frac{1}{6} \leq \frac{R_{er}}{R_e} \leq \frac{5}{12}$$

wherein, $R_{er}$ represents a diameter of the first recession portion of the light emitting surface; $R_e$ represents the diameter of the light emitting surface.

16. The light emitting device as claimed in claim 12, wherein the emitting surface of the LED is disposed at, or under a first plane where the opening of the cavity constituted by the light incident surface of the LED lens is located, and further satisfying the following condition:

$$0 \leq d \leq 2L_t$$

wherein, d represents a space distance between the first plane and a second plane where the emitting surface of the LED is located; $L_t$ represents a maximum distance from an arbitrary point on the light emitting surface to the light incident surface or the bottom surface along the direction parallel to the axis of rotational symmetry.

17. The light emitting device as claimed in claim 12, wherein the first recession portion of the light emitting surface is a concave surface dropping from an inner edge of the convex portion toward the light incident surface and forming a vertex along with the axis of rotational symmetry.

18. The light emitting device as claimed in claim 12, wherein the first recession portion of the light emitting surface is a convex surface dropping from an inner edge of the convex portion toward the light incident surface.

19. The light emitting device as claimed in claim 12, wherein the emitting surface of the LED is disposed in the cavity constituted by the light incident surface.

20. The light emitting device as claimed in claim 12, wherein the light emitted from the LED is transmitted through media having lower refractive index than the refractive index of the LED lens, and then enters into the LED lens.

* * * * *